(12) United States Patent
Manzano et al.

(10) Patent No.: US 10,465,553 B2
(45) Date of Patent: Nov. 5, 2019

(54) SHEATHING FOR FLUID PROBE (71) Applicant: General Electric Company, Schenectady, NY (US)

(72) Inventors: Roberto Jose Manzano, Carson City, NV (US); Andrew David Maduskuie, Greenville, SC (US); Ashley Marie Meenaghan, Greenville, SC (US); Timothy James Pfaffenroth, Taylors, SC (US)

(73) Assignee: General Electric Company, Schenectady, NY (US)

( * ) Notice: Subject to any disclaimer, the term of this patent is extended or adjusted under 35 U.S.C. 154(b) by 312 days.

(21) Appl. No.: 15/615,455

(22) Filed: Jun. 6, 2017

(65) Prior Publication Data

US 2018/0348255 A1    Dec. 6, 2018

(51) Int. Cl.

| | |
|---|---|
| *B32B 1/02* | (2006.01) |
| *G01K 1/08* | (2006.01) |
| *G01K 7/02* | (2006.01) |
| *F01D 21/00* | (2006.01) |
| *G01K 7/04* | (2006.01) |
| *B32B 1/08* | (2006.01) |
| *G01K 1/12* | (2006.01) |
| *G01K 1/10* | (2006.01) |

(52) U.S. Cl.
CPC ............ *F01D 21/003* (2013.01); *B32B 1/02* (2013.01); *B32B 1/08* (2013.01); *G01K 1/08* (2013.01); *G01K 1/083* (2013.01); *G01K 1/10* (2013.01); *G01K 1/12* (2013.01); *G01K 7/04* (2013.01)

(58) Field of Classification Search
CPC  G01K 1/08; G01K 1/083; G01K 1/10; G01K 1/12; G01K 7/02; G01K 7/04; B32B 1/02; B32B 1/08
See application file for complete search history.

(56) References Cited

U.S. PATENT DOCUMENTS

| | | | | |
|---|---|---|---|---|
| 3,713,899 | A | * | 1/1973 | Sebestyen ................ G01K 7/04 136/201 |
| 4,117,926 | A | * | 10/1978 | Turner .................... G01K 1/083 374/209 |
| 4,950,084 | A | | 8/1990 | Bailleul et al. |
| 2010/0290733 | A1 | | 11/2010 | Xia et al. |
| 2015/0260607 | A1 | * | 9/2015 | Fuller .................... G01M 15/14 356/73.1 |
| 2016/0266009 | A1 | | 9/2016 | Erlund |

* cited by examiner

*Primary Examiner* — Walter Aughenbaugh
(74) *Attorney, Agent, or Firm* — Dale Davis; Hoffman Warnick LLC (57) ABSTRACT

The present disclosure relates to probe sheaths adapted for a probe housing positioned within a turbomachine fluid flow path. A probe sheath according to the disclosure can include: a non-metallic sheathing material having at least one opening shaped to enclose a first portion of a fluid probe therein, the non-metallic sheathing material being sized for placement within an interior cavity of the probe housing; and a metallic sheathing material mechanically coupled to a first end of the non-metallic sheathing material and sized for placement within the interior cavity of the probe housing. The metallic sheathing material may include at least one opening in fluid communication with the at least one opening of the non-metallic sheathing material, and may be shaped to enclose a second portion of the fluid probe therein.

18 Claims, 7 Drawing Sheets

SHEATHING FOR FLUID PROBE

BACKGROUND

The subject matter disclosed herein relates to the protection of fluid probes in harsh operating environments. More specifically, the present disclosure relates to a sheathing for fluid probes adapted for use in turbomachine fluid flow paths.

In turbomachines, such as gas turbines, the properties of an operating fluid may substantially affect the performance characteristics (e.g., efficiency) of a turbomachine assembly. Many turbomachines include several stages which extract energy from successively lower-pressure operating fluids. In a low pressure stage of a turbomachine, even minor changes in an operating fluid's pressure, temperature, and/or fluid velocity can cause high percentage changes to the turbomachine's performance. Various probes can be installed within a turbomachine to measure operational parameters, e.g., temperature, pressure, and/or flow rate, of fluids within the turbomachine during operation.

Fluid probes are reliable measuring instruments, but may experience wear after extended use. Fluid probes adapted for use in a fluid flow path of a turbomachine, e.g., a hot gas path portion of a gas turbine, may be susceptible to wear from elevated temperatures and/or exposure to reactive or catalyzing particles within the fluid flow path of the turbomachine. One or more protective devices or instruments can be deployed to protect fluid probes from such conditions, but conventional structures may interfere with the operation of the probe and/or rely upon materials with other disadvantages. Metallic covers for fluid probes, for example, can exhibit high thermal conductivity and/or may chemically react with the turbomachine fluid to produce corroded material and/or deposits during use over extended periods. In some cases, metallic covers and/or other metal components formed from less-expensive materials may eventually lose material strength when operating at elevated temperatures over a long time. Some otherwise acceptable metallic coverings may be expensive to produce, and thus may not be practical for large numbers of turbomachines.

SUMMARY

A first aspect of the disclosure provides probe sheath adapted for a probe housing positioned within a turbomachine fluid flow path, the probe sheath including: a non-metallic sheathing material having at least one opening shaped to enclose a first portion of a fluid probe therein, the non-metallic sheathing material being sized for placement within an interior cavity of the probe housing; and a metallic sheathing material mechanically coupled to a first end of the non-metallic sheathing material and sized for placement within the interior cavity of the probe housing, wherein the metallic sheathing material includes at least one opening in fluid communication with the at least one opening of the non-metallic sheathing material, and shaped to enclose a second portion of the fluid probe therein.

A second aspect of the disclosure provides an apparatus including: a fluid probe positioned within an interior cavity of a probe housing for a turbomachine fluid flow path; a non-metallic sheathing material having at least one opening shaped to enclose a first portion of the fluid probe therein, the non-metallic sheathing material being sized for placement within the fluid probe; and a metallic sheathing material mechanically coupled to a first end of the non-metallic sheathing material and sized for placement within the fluid probe, wherein the metallic sheathing material includes at least one opening in fluid communication with the at least one opening of the non-metallic sheathing material, and shaped to enclose a second portion of the fluid probe therein.

A third aspect of the disclosure provides an apparatus including: a thermocouple positioned within an interior cavity of a probe housing, the probe housing being positioned within a turbomachine fluid flow path, wherein the thermocouple includes a pair of conductive wires connected together at a sensing junction; a non-metallic sheathing material having at least one opening shaped to enclose a first portion of the thermocouple therein, the non-metallic sheathing material being sized for placement within the probe housing; and a metallic sheathing material mechanically coupled to a first end of the non-metallic sheathing material and sized for placement within the probe housing, wherein the metallic sheathing material includes at least one opening in fluid communication with the at least one opening of the non-metallic sheathing material, and shaped to enclose a second portion of the thermocouple therein.

BRIEF DESCRIPTION OF THE DRAWINGS

These and other features of the disclosed apparatuses will be more readily understood from the following detailed description of the various aspects of the apparatus taken in conjunction with the accompanying drawings that depict various embodiments of the invention, in which.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
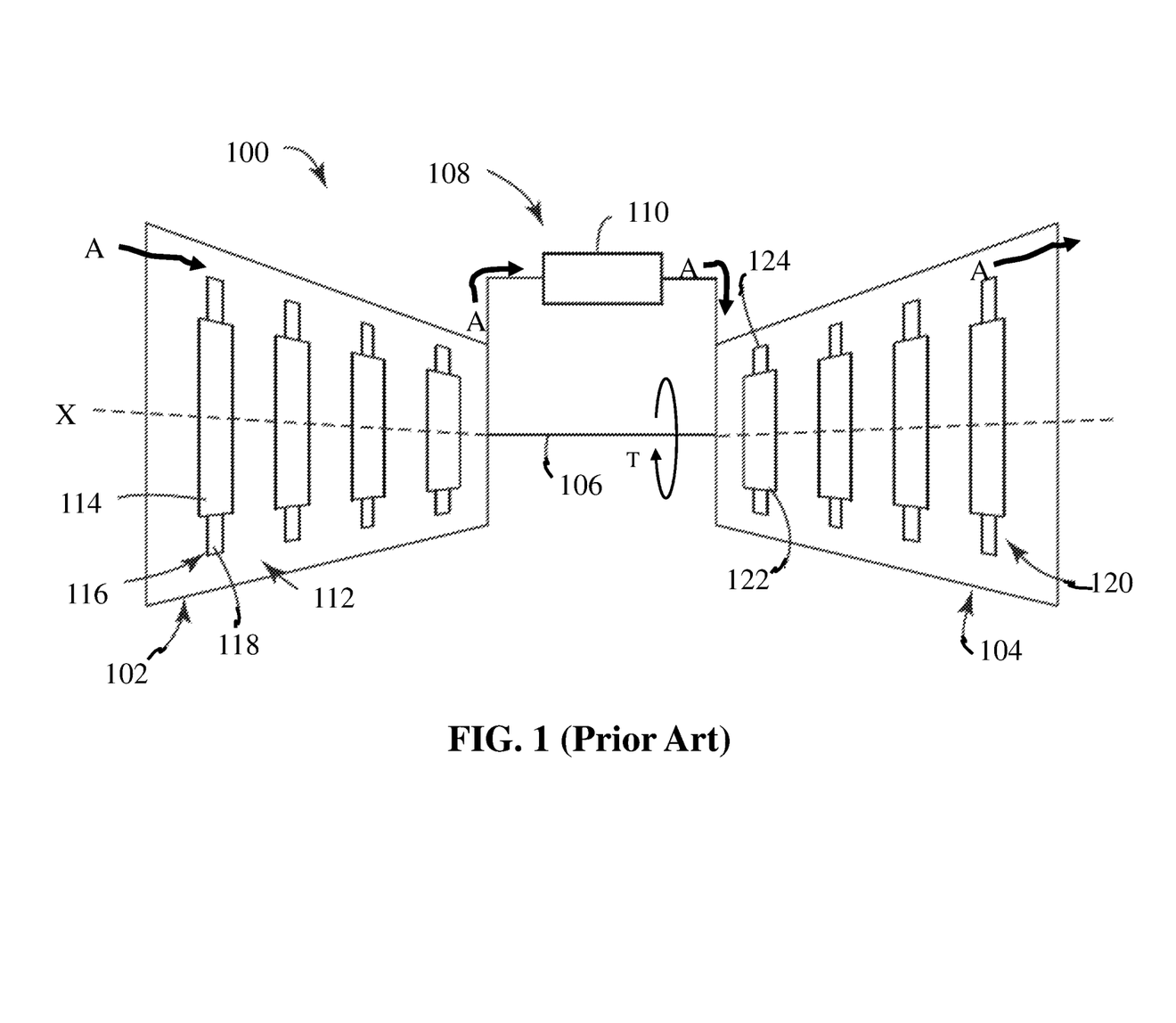
FIG. 1 is a schematic view of a conventional turbomachine system.

FIG. 1 shows a conventional turbomachine 100 that includes a compressor portion 102 operatively coupled to a turbine portion 104 through a common compressor/turbine rotor (simply "rotor" hereafter) 106. As used herein, the terms "axial" and/or "axially" refer to the relative position/direction of objects along axis $A_R$, which is substantially parallel with the axis of rotation of the turbomachine (in particular, the rotor section). Additionally, the terms "circumferential" and/or "circumferentially" refer to the relative position/direction of objects along a circumference which surround a particular axis but does not intersect the same axis at any location.

Compressor portion 102 can be fluidically connected to turbine portion 104 through a combustor assembly 108. Combustor assembly 108 includes one or more combustors 110. Combustors 110 may be mounted to turbomachine 100 in a wide range of configurations including, but not limited to, being arranged in a can-annular array. Compressor portion 102 includes a plurality of compressor rotor wheels 112. Rotor wheels 112 include, e.g., first stage compressor rotor wheels 114 (simply "wheels" hereafter) having a plurality of first stage compressor rotor blades 116 each having an associated airfoil portion 118. Similarly, turbine portion 104 includes a plurality of turbine rotor wheels 120 including a first stage turbine wheel 122 having a plurality of first stage turbine rotor blades 124. A turbomachine fluid 130 (FIG. 2), which can be in the form of air, fuel, and/or other fluids, can flow through turbomachine 100 substantially along the direction of arrows A to define a fluid flow path as described herein. Various embodiments of the disclosure can include probe sheaths for protecting and structurally supporting various instruments used to measure the fluid properties (e.g., temperature, pressure, flow rate, etc.) of turbomachine fluid 130 in turbomachine 100 to maintain resilience against harsh operating conditions, as discussed herein.

Figure 2:
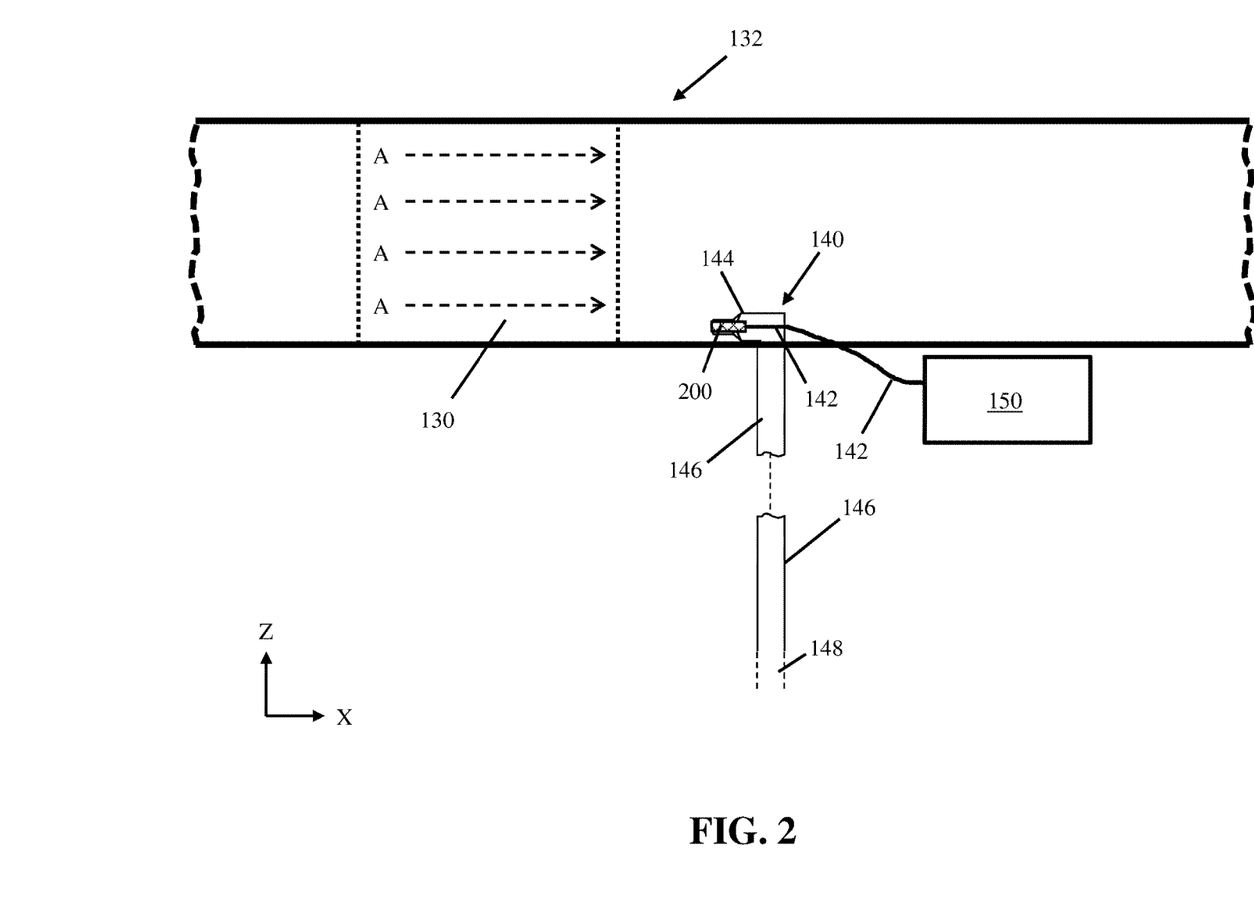
FIG. 2 is a cross-sectional view in plane X-Z of a turbomachine fluid flow path and probe housing according to embodiments of the disclosure.

Turning to FIG. 2, an example fluid flow path 132 of a turbomachine system, such as turbomachine 100 (FIG. 1), is shown. Fluid flow path 132 can represent part of a fluid flow path for turbomachine fluid 130, e.g., one or more stages of turbine portion 104 in turbomachine 100. Turbomachine fluid 130, which can be in the form of a combustion gas and/or other fluids, can flow through fluid flow path 132 substantially along the direction of arrows A. Turbomachine fluid 130 within fluid flow path 132 may have particular values of pressure, temperature, fluid velocity, etc., and a user or operator may desire to know these particular properties of turbomachine fluid 130 to analyze the turbomachine's performance. A probe housing 140 for one or more fluid probes 142 can be positioned within fluid flow path 132 to monitor the temperature, pressure, flow rate, fluid velocity, and/or other properties of turbomachine fluid 130. In an embodiment, probe housing 140 can include a kiel head pressure port 144 which may be oriented in a particular direction, e.g., directly opposed to the flow of turbomachine fluid 130 along arrow A. Probe housing 140 can include a tube 146 for diverting a small amount of turbomachine fluid 130 toward an outlet 148 positioned in fluid communication with, e.g., another portion of fluid flow path 132, one or more measuring tools, and/or other pathways for turbomachine fluid 130. Probe housing 140, fluid probe 142, and/or tube 146 can be structured to have any desired length, e.g., several inches, several feet, etc., and tube 146 in particular is shown with a broken line to illustrate an indeterminate length.

Fluid probe 142 may take the form of any currently-known or later developed instrument sized for placement within probe housing 140, and can include one or more devices for measuring and/or communicating the properties of turbomachine fluid 130 in fluid flow path 132, e.g., temperature, pressure, flow rate, etc., as described elsewhere herein. According to various examples, fluid probes 142 for measuring temperature can take the form of a thermometer, thermocouple (i.e., a voltage device indicating changes in temperature from changes in voltage), a resistive temperature sensing device (i.e., a device for evaluating temperature from changes in electrical resistance), an infrared sensor, an expansion-based sensor (i.e., a sensor for deriving changes in temperature from the expansion or contraction of a material such as a metal), and/or a state-change sensor. Fluid probes 142 in the form of pressure sensors can include barometers, manometers, tactile pressure sensors, optical pressure sensors, ionizing pressure sensors, etc. For calculating flow rate and/or other kinetic properties of turbomachine fluid 130, fluid probes 142 can include, e.g., air flow meters, mass flow sensors, anemometers, etc. Fluid probes 142 may also derive one or more parameters from other measured quantities, e.g., temperature, pressure, flow rate, etc. These measured quantities, in turn, can be measured at multiple positions of fluid flow path 132 and applied to mathematical models of fluid flow through a particular component, e.g., via a controller 150. Controller 150 can be communicatively connected to fluid probe 142, e.g., by way of any currently-known or later-developed data coupling, including wired and/or wireless data couplings. Each fluid probe 142 can include components for measuring variables related to temperature and processing components (e.g., computer software) for prediction and/or calculating values of temperature or other metrics based on the related variables.

To automatically implement various functions, controller (s) 150 can be coupled to fluid probe(s) 142, and/or various components of turbomachine 100 to measure the properties of turbomachine fluid 130. Controller(s) 150 and/or other devices connected thereto can be configured to adjust various operational parameters of turbomachine 100 based on measurements by fluid probes 142. Controller 150 can generally include any type of computing device capable of performing operations by way of a processing component (e.g., a microprocessor) and as examples can include a computer, computer processor, electric and/or digital circuit, and/or a similar component used for computing and processing electrical inputs. To this extent, controller 150 can be communicatively connected to fluid probe 142 by way of any currently-known or later developed connection for processing and/or exchanging signals therebetween, including, e.g., one or more hard-wired and/or wireless coupling components, networks, etc.

Figure 3:
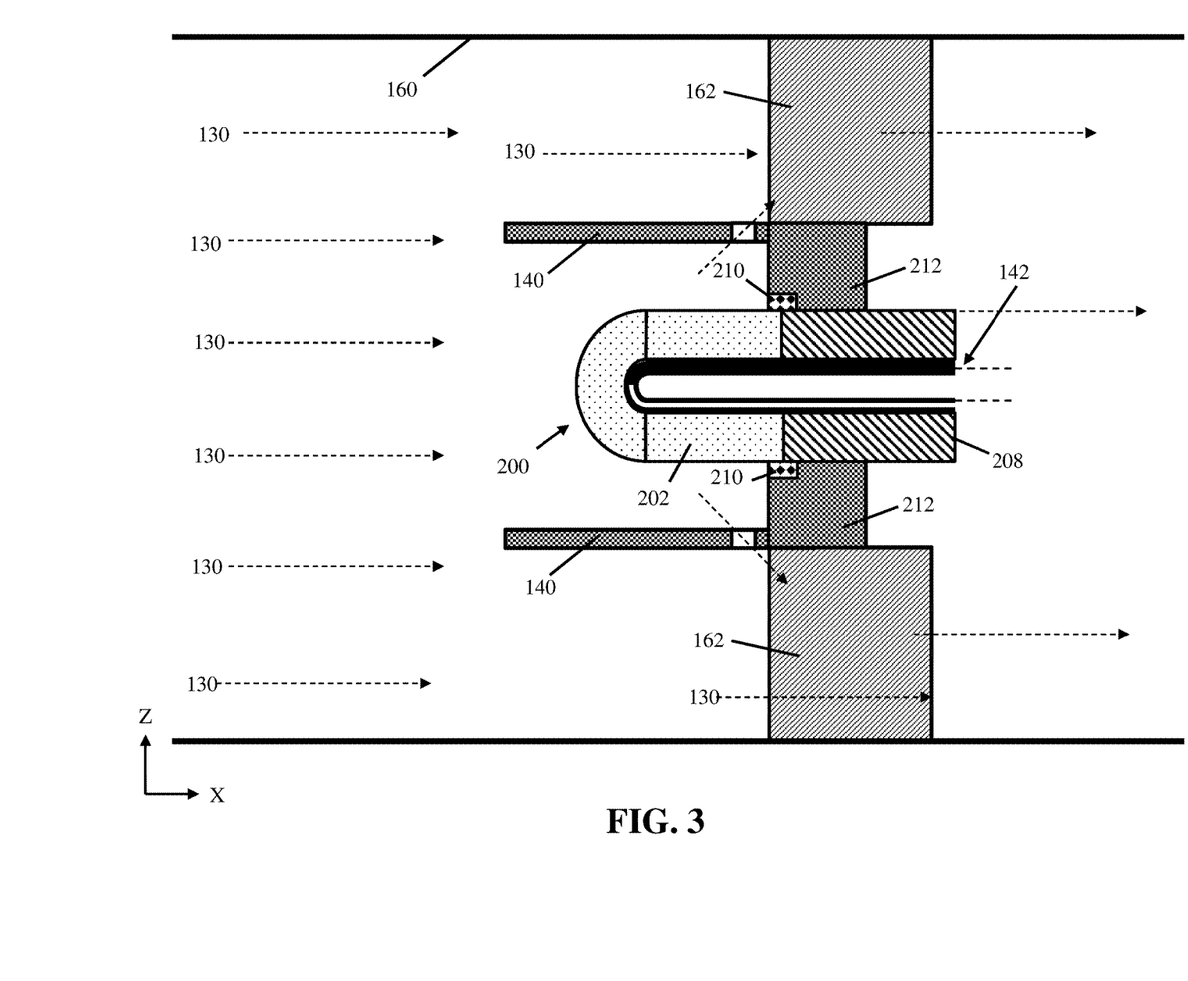
FIG. 3 is a cross-sectional view in plane X-Z of a turbomachine fluid flow path, probe housing, and fluid probe according to embodiments of the disclosure.

Referring to FIG. 3, fluid probe 142 can also be adapted for use in other structures of an assembly, e.g., turbomachine 100 (FIG. 1). As shown, probe housing 140 may instead take the form of a pre-existing or conventional turbomachine component, e.g., part of a nozzle, blade, casing, etc., instead of an additional probe or mechanism separately added to fluid flow path 132. In the example of FIG. 3, probe housing 140 is shown to be part of a turbomachine nozzle 160, and connect to turbomachine nozzle 160 through an adapter 162 installed thereon. Fluid flow path 132 may nevertheless pass extend through portions of probe housing 140 to allow fluid probe 142 to measure various characteristics of a turbomachine fluid during operation.

Regardless of how fluid probe 142 is embodied, the components included therein may be sensitive to the composition and properties of turbomachine fluid 130 in fluid flow path 132. Embodiments of the disclosure provide a probe sheath 200 for fluid probe 142 of turbomachine 100 (FIG. 1). Probe sheath 200 can include multiple materials for shielding at least a portion of fluid probe 142 from fluids within fluid flow path 132 of turbomachine 100. According to an embodiment, fluid probe 142 can be adapted for placement within fluid flow paths 132 having a temperature of at least approximately 1250 degrees Celsius (° C.), e.g., as may be seen in a turbine section of a hot gas path in a gas turbine assembly. Probe sheath 200 thus can include various components with a material composition for withstanding the elevated temperatures and/or other environmental conditions within fluid flow path 132 of turbomachine 100 without impeding the operation of fluid probe(s) 142 therein.

Figure 4:
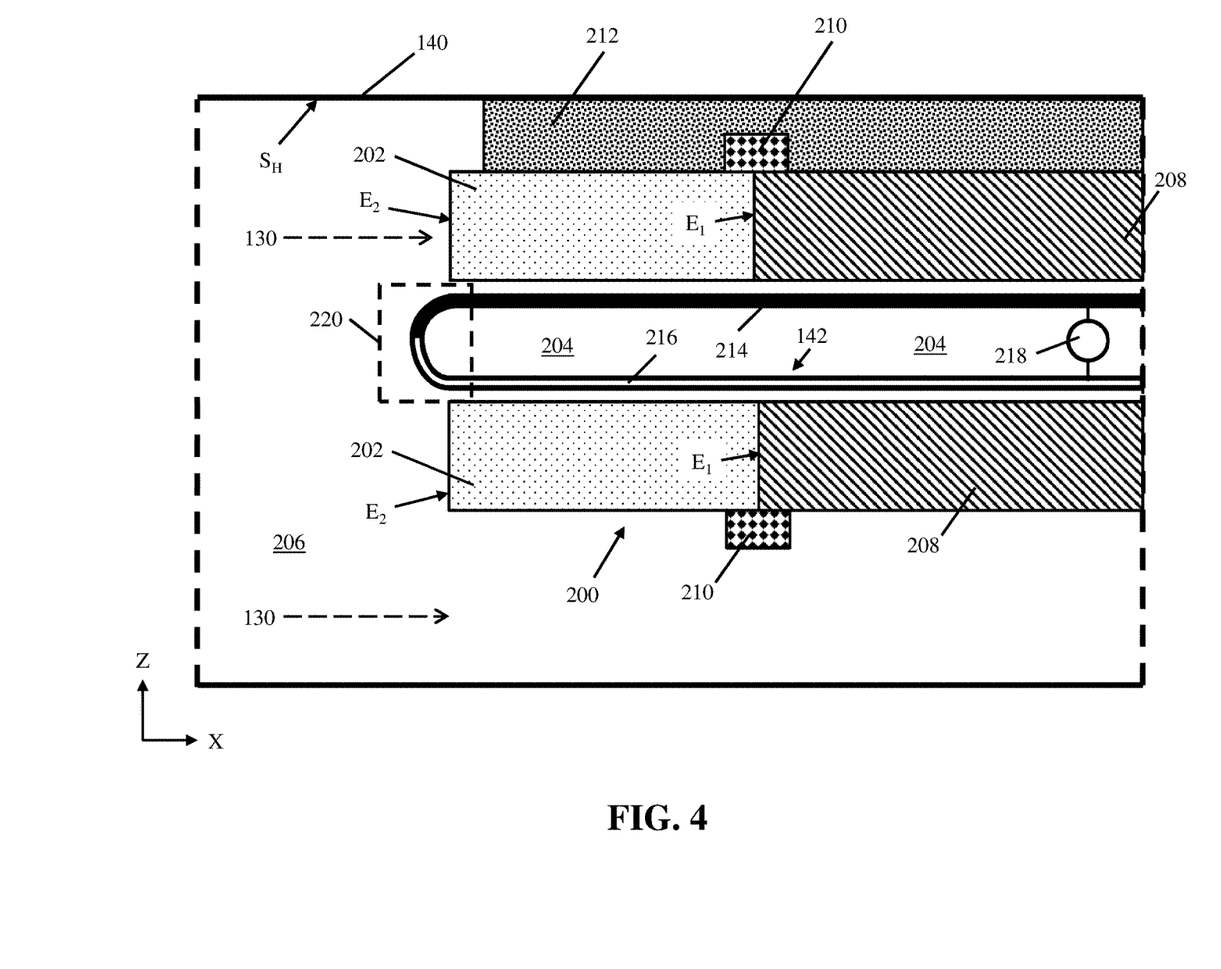
FIG. 4 is a cross-sectional view in plane X-Z of a probe sheath and fluid probe in a probe housing according to embodiments of the disclosure.

Turning to FIG. 4, probe sheath 200 is shown with fluid probe 142 within probe housing 140 and in fluid communication with turbomachine fluid 130 within probe housing 140. Embodiments of probe sheath 200 can be sized for placement within probe housing 140 which receives a portion of turbomachine fluid 130 from fluid flow path 132 (FIG. 2) where probe housing 140 is deployed. Probe sheath 200 can include a non-metallic sheathing material 202 having at least one opening 204 therein, e.g., a hollow interior, a passage, a chamber, and/or other cavity sized to accommodate at least a portion of fluid probe 142 therein. Non-metallic sheathing material 202 may, in turn, be sized for placement within an interior cavity 206 of probe housing 140, such that a cross-section of non-metallic sheathing material 202 occupies only a portion of interior cavity 206. Regardless of the material composition and structure of fluid probe 142, non-metallic sheathing material 202 of probe sheath 200 can fluidly separate at least part of fluid probe 142 from turbomachine fluid 130 within interior cavity 206 of probe housing 140.

Non-metallic sheathing material 202 can be structured to encase, cover, and/or at least partially enclose portions of fluid probe 142. The material composition of non-metallic sheathing material 202 can be chosen to accommodate varying environments and/or situations. In an example embodiment, non-metallic sheathing material 202 can include one or more thermally non-conductive materials, e.g., to reduce thermal communication between fluid probe 142 and turbomachine fluid 130 within interior cavity 206. Non-metallic sheathing material 202 can thus be formed of any material having a low thermal conductivity, e.g., a thermal conductivity of less than approximately thirty watts per meter-kelvin (W/(m·k)), or more specifically, less than approximately ten W/(m·k). In addition or alternatively, non-metallic sheathing material 202 can be formed of a chemically inert material selected to prevent oxidation, reaction, etc., in the presence of turbomachine fluid 130 at elevated temperatures. Appropriate materials for non-metallic sheathing material 202 which remain chemically inert in the presence of turbomachine fluid 130 (e.g., hot combustion gases or products) can include zirconia ($ZrO_2$), alumina ($Al_2O_3$), magnesia (MgO), and/or sapphire ($\alpha\text{-}Al_2O_3$). More generally, the composition of non-metallic sheathing material 202 can include, e.g., one or more ceramic materials and/or ceramic-metal composite materials. Thus, any material composition including one or more metallic substances may be considered to be a "non-metallic" material so long as at least one of its individual chemical components includes a non-metallic substance.

Probe sheath 200 can additionally include a metallic sheathing material 208 coupled to a first end $E_1$ of non-metallic sheathing material 202, e.g., by being mechanically coupled thereto with or without intervening mechanical coupling components. According to an embodiment, sheathing materials 202, 208 may be directly connected to each other by chemical bonding, e.g., at first end $E_1$ of non-metallic sheathing material 202. According to other embodiments, one or more connecting components may mechanically connect sheathing materials 202, 208 together as described in further detail herein. Metallic sheathing material 208 can include at least one opening 204 therein sized for fluid communication with opening(s) 204 within non-metallic sheathing material 202. Any singular reference to opening 204 of sheathing materials 202, 208 is thus understood to encompass multiple openings 204. Opening 204 of metallic sheathing material 208 can thus have substantially the same size as non-metallic sheathing material 202 and/or may be differently sized. Opening 204 within metallic sheathing material 208 can be structured for another portion of fluid probe 142 to be placed therein. In an example embodiment, openings 204 of each sheathing material 202, 208 can take the form of an aperture extending substantially along X-axis such that each opening 204 defines a continuous or substantially continuous region for receiving portions of fluid probe 142. In some cases, the size of opening 204 within fluid probe 142 can be dependent upon the shape and size of fluid probe 142, e.g., in embodiments where fluid probe 142 is potted within sheathing materials 202, 208 during the manufacture of probe sheath 200. In this case, fluid probe 142 and subcomponents thereof can be potted in place with a ceramic cement and/or other currently-known or later developed refractory adhesive material. Metallic sheathing material 208 can have a distinct material composition from non-metallic sheathing material 202, and more specifically can be formed, selected, etc., without regard to thermal conductivity and/or susceptibility to react with turbomachine fluid 130. In an example embodiment, metallic sheathing material 208 can include one or more metals and/or metallic substances (e.g., alloys, metallic compounds, etc.) capable of housing and/or at least partially enclosing fluid probe 142 therein. In a more specific example, metallic sheathing material 208 can be formed wholly or partially of platinum (Pt), an alloy of platinum and rhodium (Rh), etc.

Probe sheath 200 can optionally include various components for mechanically coupling portions thereof together and/or to an interior surface $S_H$ of probe housing 140. As shown, probe sheath 200 can include a collar 210 mechanically coupled to exposed surfaces of sheathing materials 202, 208. More specifically, probe sheath 200 can be positioned alongside first end $E_1$ of non-metallic sheathing material 202 such that collar 210 structurally adjoins and/or contacts the junction between sheathing materials 202, 208. Collar 210, in some cases, may also be directly axially interposed (e.g., along X-axis) between sheathing materials 202, 208. Collar 210 can include one or more of the same materials included within metallic sheathing material 208, and/or may include a different metallic substance. According to one example, collar 210 may be formed from an alloy of platinum and rhodium (Rh). Metals may be advantageous for some application of probe sheath 200, e.g., due to the ability for collar 210 to be bonded to the outer periphery of sheathing materials 202, 208 and provide a sufficient seal strength to maintain the mechanical connection between sheathing materials 202, 208 during operation. To this extent, forming metallic sheathing material 208 and collar 210 from at least one of the same materials may be particularly advantageous, e.g., to provide a stronger bond and/or material strength. However, it is understood that collar 210 may include one or more non-metallic materials (e.g., one or more ceramic materials) in alternative applications. In still other embodiments, collar 210 can take the form of an adhesive substance applied to sheathing materials 202, 208 to mechanically bond each material together. In any case, a weld and/or an adhesive can be formed between collar 210 and sheathing materials 202, 208 to provide a mechanical connection between these components during operation.

Probe sheath 200 can also include structures and/or components for mechanically coupling sheathing material(s) 202, 208 to one or more surfaces $S_H$ of interior cavity 206 in probe housing 140. For instance, a probe sheath 200 can include a mount 212 formed on an outer periphery of sheathing materials 202, 208 and/or collar 210 to join probe sheath 200 to interior surface $S_H$ of probe housing 140. Mount 212 can be formed from one or more currently-known or later developed materials suitable for joining sheathing materials 202, 208 to surface(s) $S_H$ of interior cavity 206. According to an example, mount 212 can be formed of one or more metals mechanically coupled to and/or formed on sheathing materials 202, 208, in addition to probe housing 140 by way of any currently-known or later developed bonding technique. In an embodiment, mount 212 can include one or metallic subcomponents of non-metallic sheathing material 202 and/or a metal of metallic sheathing material 208 brazed to interior surface $S_H$ by any currently-known or later developed brazing technique. Mount 212 can additionally or alternatively include, e.g., metals bonded between surface(s) $S_H$ and sheathing materials 202, 208 by other metallurgical techniques (e.g., welding, soldering, etc.), one or more non-metallic adhesive materials, or mechanical fasteners, etc.

As noted herein, probe sheath 200 can be structured to accommodate a variety of fluid probes 142, e.g., temperature sensors, pressure sensors, flow rate sensors, etc. Where fluid probe 142 is embodied as and/or includes a thermocouple, probe sheath 200 can be shaped to accommodate the various operational features of a thermocouple. For example, fluid probes 142 in the form of a thermocouple can include a first conductive wire 214 and a second conductive wire 216 with distinct electrical conductivities, e.g., by having different material compositions and/or properties. In this case, fluid probe 142 can include a voltage sensor 218 electrically coupled between first and second conductive wires 214, 216 at respective terminals to measure the difference in electrical potential between first and second conductive wires 214, 216. Where voltage sensor 218 exists within probe housing 140, voltage sensor 218 can represent a "cold junction" where the dissimilar metals of each conductive wire 214 electrically connect to each other through another metallic coupling with at least one material present in each wire 214, 216. In an example, the material composition of voltage sensor 218 can include a copper wire. In other embodiments, voltage sensor 218 can be positioned at a remote location relative to probe housing 214 to measure the voltage drop at a sensing junction 220 of fluid probe 142. Although voltage sensor 218 is shown to be positioned within metallic sheathing material 208, it is to be understood that voltage sensor 218 may appear more frequently outside probe sheath 200, e.g., to reduce the influence of turbomachine fluid on voltage sensor 218. Fluid probe 142 can include a sensing junction 220 positioned at an axial end of fluid probe 142 where first conductive wire 214 contacts to second conductive wire 216. Voltage sensor 218 and conductive wires 214, 216 of fluid probe 142 can also be connected to controller 150 (FIG. 2) for calibrating measured voltages during operation, e.g., to identify the difference in electrical potential between baseline values and values during operation of turbomachine 100 (FIG. 1). Controller 150 can thereby indicate the temperature within probe housing 140 based on the measured voltage drop across sensing junction 220. Sensing junction 220 can be positioned in fluid communication with the flow of turbomachine fluid 130 within probe housing 140.

To shield fluid probe 142 from the effects of turbomachine fluid 130 within probe housing 140, non-metallic sheathing material 202 can extend substantially in parallel with a portion of first and second conductive wires 214, 216 without fully enclosing sensing junction 220. Thus, sensing junction 220 can be configured to monitor turbomachine fluid 130 without being affected by the presence of probe sheath 200 proximate fluid probe 142. Furthermore, voltage sensor 218 can continue to measure a voltage drop at the junction between wires 214, 216 to measure the temperature of fluids within probe housing 140. As noted elsewhere herein, probe sheath 200 can optionally include additional components positioned on or nearby sensing junction 220.

Figure 5:
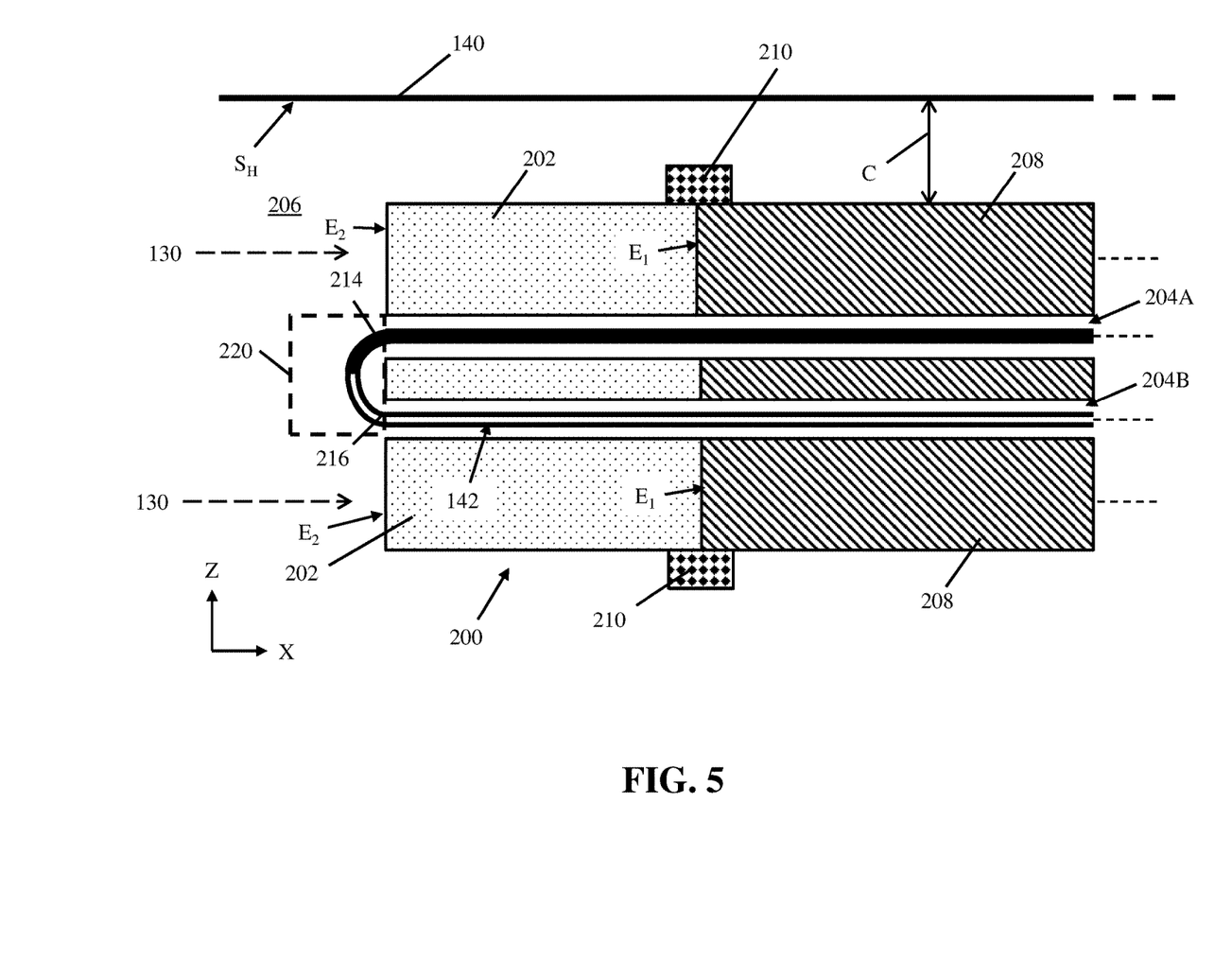
FIG. 5 is a cross-sectional view in plane X-Z of a probe sheath with a pair of passages according to embodiments of the disclosure.

Turning to FIG. 5, another cross-sectional view of probe sheath 200 is shown to illustrate additional features of the disclosure. In particular, sheathing materials 202, 208 can be structured to include a first passage 204A and a second passage 204B as alternative forms of opening 204 (FIG. 4), described elsewhere herein. Passages 204A, 204B can be structured to accommodate the shape of first and second conductive wires 214, 216 of fluid probes 142 in the form of a thermocouple. Where fluid probe 142 is potted within sheathing materials 202, 208, conductive wires 214, 216 may be circumferentially in contact with the material composition of sheathing materials 202, 208. Passages 204A, 204B can extend substantially linearly (e.g., in the direction of X-axis) and terminate at second end $E_2$ of non-metallic sheathing material 202. Conductive wires 214, 216 can thus form sensing junction 220 outside passages 204A, 204B to measure the properties of turbomachine fluid 130 outside probe sheath 200. Although passages 204A, 204B are shown to be single passages each shaped to accommodate a respective conductive wire 214, 216 therein, other embodiments are contemplated. For example, each passage 204A, 204B may represent a portion of a single, substantially annular opening 204 (FIG. 4) within sheathing materials 202, 208 such that multiple conductive wires 214, 216 can pass therethrough. Various combinations of openings 204 and passages 204A, 204B can be formed within sheathing materials 202, 208 to accommodate a variety of fluid probes 142 and/or operational conditions.

As also shown in FIG. 5, fluid probe 142 probe sheath 200 can be positioned within probe housing 140 without being directly coupled to interior surface $S_H$ of probe housing 140. More specifically, mount 212 can be omitted in various embodiments of the disclosure. Omitting mount 212 may be suitable in cases where fluid probe 142 and/or probe sheath 200 are configured to expand or contract in response to various operational characteristics of turbomachine fluid 130 (FIG. 2). To accommodate the effect of pressure changes, fluid probe 142 and probe sheath 200 thereon can be suspended within interior cavity 206, such that a clearance region C exists between probe sheath 200 and interior surface $S_H$ of probe housing 140. Coupling one or more ends of fluid probe 142 and/or probe sheath 200 can instead be mechanically connected to other structures turbomachine structures, surfaces, such as axially displaced surfaces of probe housing 140, tube 146 (FIG. 2), etc., such that fluid probe 142 and probe sheath 200 are at least partially suspended within interior cavity 206 without contacting at least a portion of interior surface $S_H$. In any case, fluid probe 200 can include the various additional and/or alternative subcomponents described herein (e.g., collar 210, opening 204, passages 204A, 204B, etc.).

Figure 6:
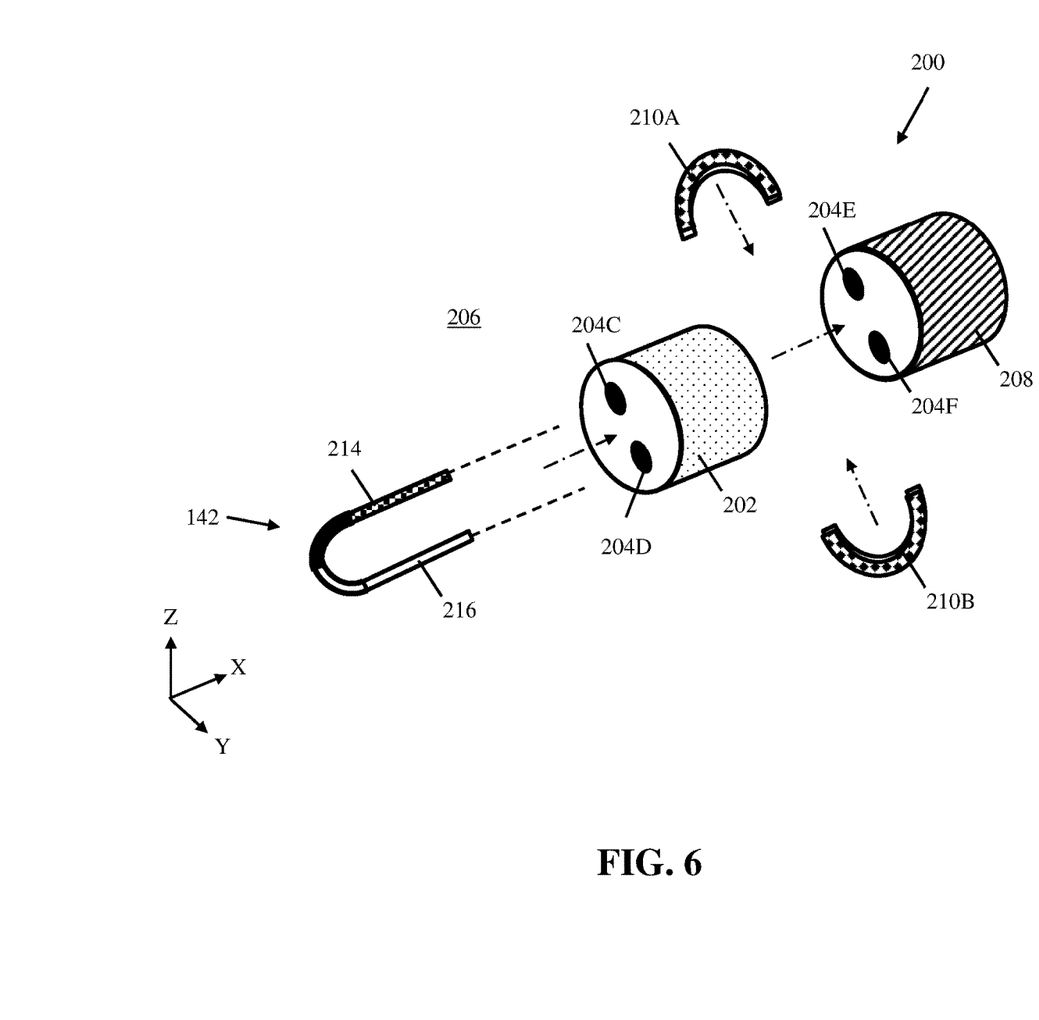
FIG. 6 is a three-dimensional assembly view of a probe sheath according to embodiments of the disclosure.

FIG. 6 provides an assembly view of probe sheath 200 relative to fluid probe 142 to further demonstrate structural features of the present disclosure. Probe sheath 200 can be positioned within interior cavity 206 and/or on fluid probe 142 within probe housing 140 of turbomachine 100 in situ, or can be assembled together with fluid probe 142 as described herein. Before assembly begins, non-metallic sheathing material 202 can be provided as a unitary body of material having a predetermined geometrical configuration (e.g., a cylindrical shape as shown in FIG. 6, a polygonal shape, a spherical shape, and/or any other appropriate three-dimensional structure). Non-metallic sheathing material 202 can be shaped for portions of fluid probe 142 to pass therethrough, e.g., by including passages 204C, 204D shaped to receive first and second conductive wires 214, 216 in respective portions of non-metallic sheathing material 202. Similar to non-metallic sheathing material 202, metallic sheathing material 208 can be shaped for other portions of fluid probe 142 to pass therethrough. More specifically, non-metallic sheathing material can take the form of a unitary body of material with passages 204E, 204F therein shaped to hold first and second conductive wires 214, 216, or other portions of fluid probe 142.

During assembly, sheathing materials 202, 208 can physically engage and/or contact each other such that any openings therein, e.g., passages 204C, 204D of non-metallic sheathing material 202 and passages 204E, 204F of metallic sheathing material, are substantially aligned (e.g., along X-axis as shown). Sheathing materials 202, 208 can then be bonded together as described elsewhere herein, regardless of whether fluid probe 142 is present within each sheathing material 202, 208 at the time of assembly. Thereafter, probe sheath 200 can continue to be assembled by forming collar 210 (FIGS. 4-5) thereon at the physical junction between sheathing materials 202, 208. In an example, collar 210 can initially take the form of two collar portions 210A, 210B shaped to matingly engage each other, and as shown may each be in the form of a hemispherical body or other complementarily-shaped component. Collar portions 210A, 210B can be joined together by any currently-known or later developed methodology for mechanically assembling two pieces of a component, including without limitation: interlocking features, adhesive bonding, metallurgical coupling (e.g., brazing, welding, soldering, etc., as discussed herein), snap-fit junctions, externally-fastened junctions, etc. Fluid probe 142 can be inserted into each sheathing material 202, 208 before or after the various components of probe sheath 200 have been assembled.

Figure 7:
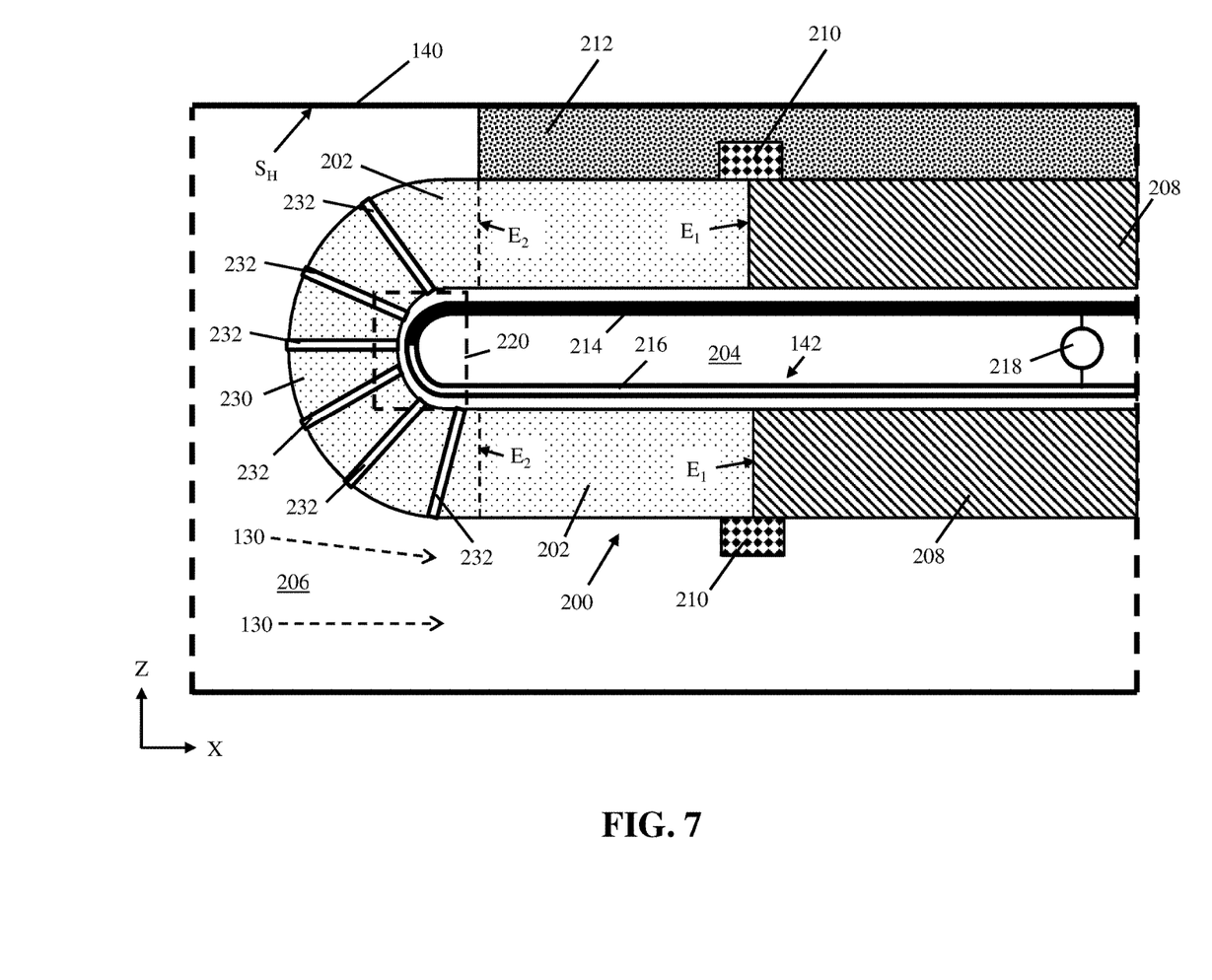
FIG. 7 is a cross-sectional view in plane X-Z of a probe sheath with a non-metallic cap according to embodiments of the disclosure.

Referring to FIG. 7, embodiments of the disclosure can include additional features for structurally insulating fluid probe 142 from turbomachine fluid 130 during operation of turbomachine 100 (FIG. 1). Probe sheath 200 can optionally include a non-metallic cover 230 mechanically coupled to second end $E_2$ of non-metallic sheathing material 202. Non-metallic cover 230 can take the form of any hollow or partially-hollow structure shaped to encapsulate sensing junction 220 and/or other exposed portions of fluid probe 142 therein. As an example, non-metallic cover can include a substantially cylindrical body having a concave interior shaped to circumferentially engage axially aligned surfaces of non-metallic sheathing material 202, e.g., at second end $E_2$ thereof. As a further example, non-metallic cover 230 can be structured in the form of a non-metallic protective coating applied directly to exposed portions of fluid probe 142, e.g., to protect the material composition thereof. Non-metallic cover 230 can be joined to non-metallic sheathing material 202 by any currently-known or later developed method for mechanically joining two non-metallic materials, and/or by other mechanical couplings described herein. According to further embodiments, non-metallic sheathing material 202 and non-metallic cover 230 can represent portions of a unitary component for at least partially enclosing fluid probe 142 therein. Thus, non-metallic cover 230 can be shaped to enclose a sensing component, e.g., sensing junction 220 between wires 216, 218, of fluid probe 142 to further separate fluid probe 142 from turbomachine fluid 130.

To maintain a limited amount of fluid communication between fluid probe 142 within opening(s) 204 of probe sheath 200, and interior cavity 206 of probe housing 140, non-metallic cover 230 can optionally include one or more pathways 232 for fluid flow from interior cavity 206 into opening(s) 204. Pathways 232 can additionally or alternatively be structured to substantially impede fluid communication from interior cavity 206 into opening(s) 204, while permitting heat exchange between fluid probe 142 and interior cavity 206. In some cases, pathways 232 may be absent from non-metallic sheathing material 202 and/or non-metallic cover 230 to fluidly isolate fluid probe 142 from interior cavity 206 of probe housing 140. Fluid probe 142 may remain capable of measuring various aspects of turbomachine fluid 130 in interior cavity 206, e.g., by non-metallic sheathing material 202 and/or non-metallic cover 230 including a thermally conductive material.

The various embodiments discussed herein can offer several technical and commercial advantages, some of which are discussed herein by way of example. Embodiments of probe sheath 200 improve upon conventional protective structures for fluid probes 142, e.g., by providing distinct material compositions to improve the durability and performance of fluid probes 142 during operation. In addition, the probe sheath 200 can be formed at least partially from relatively inexpensive materials to reduce the use of expensive metal shields with properties suitable for only a smaller number of situations. Such advantages can also provide more accuracy and precision in measurements by fluid probe 142 during the operation of turbomachine 100 (FIG. 1) even in high-temperature environments, e.g., fluid flow paths located downstream of a combustor component.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A probe sheath adapted for a probe housing positioned within a fluid flow path, the probe sheath comprising:
a non-metallic sheathing material having at least one opening shaped to enclose a first portion of a fluid probe therein, the non-metallic sheathing material being sized for placement within an interior cavity of the probe housing, wherein the non-metallic sheathing material includes one of a ceramic material or a ceramic-metal composite material; and
a metallic sheathing material mechanically coupled to a first end of the non-metallic sheathing material and sized for placement within the interior cavity of the probe housing, wherein the metallic sheathing material includes at least one opening in fluid communication with the at least one opening of the non-metallic sheathing material, and shaped to enclose a second portion of the fluid probe therein.

2. The probe sheath of claim 1, wherein the non-metallic sheathing material comprises one of a thermally non-conductive material or a chemically inert material.

3. The probe sheath of claim 1, wherein the non-metallic sheathing material includes one of zirconia, alumina, magnesia, or sapphire.

4. The probe sheath of claim 1, wherein the metallic sheathing material includes a platinum-rhodium alloy.

5. The probe sheath of claim 1, further comprising the fluid probe enclosed within the metallic and non-metallic sheathing materials, wherein the fluid probe includes a pair of conductive wires, and wherein the second portion of the fluid probe includes a voltage sensor coupled to the pair of conductive wires.

6. The probe sheath of claim 1, further comprising a metallic collar mechanically coupled to a junction between the metallic sheathing material and the first end of the non-metallic sheathing material.

7. The probe sheath of claim 6, wherein the metallic collar and the metallic sheathing material include a same material composition.

8. The probe sheath of claim 1, further comprising a non-metallic cover formed on a second end of the non-metallic sheathing material, wherein the non-metallic cover encapsulates at least a sensing component of the fluid probe therein.

9. The probe sheath of claim 8, wherein the fluid probe includes a pair of conductive wires, and wherein the sensing component comprises a junction between the pair of conductive wires.

10. An apparatus comprising:
a fluid probe positioned within an interior cavity of a probe housing for a turbomachine fluid flow path;
a non-metallic sheathing material having at least one opening shaped to enclose a first portion of the fluid probe therein, the non-metallic sheathing material being sized for placement within the fluid probe, wherein the non-metallic sheathing material includes one of a ceramic material or a ceramic-metal composite material; and
a metallic sheathing material mechanically coupled to a first end of the non-metallic sheathing material and sized for placement within the fluid probe, wherein the metallic sheathing material includes at least one opening in fluid communication with the at least one opening of the non-metallic sheathing material, and shaped to enclose a second portion of the fluid probe therein.

11. The apparatus of claim 10, further comprising a metallic collar mechanically coupled to an outer periphery of a junction between the non-metallic sheathing material and the metallic sheathing material through at least one of a weld or an adhesive.

12. The apparatus of claim 10, wherein the non-metallic sheathing material is brazed to the interior cavity of the probe housing.

13. The apparatus of claim 10, wherein the fluid probe includes a kiel head pressure port.

14. The apparatus of claim 10, further comprising a non-metallic cap mechanically coupled to a second end of the non-metallic sheathing material, the non-metallic cap being shaped to enclose a sensing component of the fluid probe therein.

15. An apparatus comprising:
a thermocouple positioned within an interior cavity of a probe housing, the probe housing being positioned within a turbomachine fluid flow path, wherein the thermocouple includes a pair of conductive wires connected together at a sensing junction;
a non-metallic sheathing material having at least one opening shaped to enclose a first portion of the thermocouple therein, the non-metallic sheathing material being sized for placement within the probe housing, wherein the non-metallic sheathing material includes one of a ceramic material or a ceramic-metal composite material; and
a metallic sheathing material mechanically coupled to a first end of the non-metallic sheathing material and sized for placement within the probe housing, wherein the metallic sheathing material includes at least one opening in fluid communication with the at least one opening of the non-metallic sheathing material, and shaped to enclose a second portion of the thermocouple therein.

16. The apparatus of claim 15, wherein a temperature of the turbomachine fluid flow path is at least approximately 1250 degrees Celsius (° C.).

17. The apparatus of claim 15, further comprising a non-metallic cap mechanically coupled to a second end of the non-metallic sheathing material, the non-metallic cap being shaped to enclose the sensing junction of the thermocouple therein.

18. The apparatus of claim 15, wherein the at least one opening of the non-metallic sheathing material includes a pair of passages each shaped to house one of a pair of conductive wires therein.

* * * * *